Nov. 29, 1966 G. W. BUNGAY, JR 3,288,063

METHOD AND APPARATUS FOR PREPARING MULTIPAGE PRINTING PLATES AND THE LIKE

Filed May 5, 1965 3 Sheets-Sheet 1

INVENTOR.
GEORGE W. BUNGAY, JR.
BY
MORGAN, FINNEGAN, DURHAM & PINE
ATTORNEYS

Nov. 29, 1966 G. W. BUNGAY, JR 3,288,063

METHOD AND APPARATUS FOR PREPARING MULTIPAGE PRINTING PLATES AND THE LIKE

Filed May 5, 1965 3 Sheets-Sheet 2

INVENTOR.
GEORGE W. BUNGAY, JR.
BY
MORGAN, FINNEGAN, DURHAM & PINE
ATTORNEYS

Nov. 29, 1966 G. W. BUNGAY, JR 3,288,063

METHOD AND APPARATUS FOR PREPARING MULTIPAGE PRINTING PLATES AND THE LIKE

Filed May 5, 1965 3 Sheets-Sheet 3

INVENTOR.
GEORGE W. BUNGAY, JR.

BY

MORGAN, FINNEGAN, DURHAM & PINE

ATTORNEYS 3,288,063

METHOD AND APPARATUS FOR PREPARING MULTIPAGE PRINTING PLATES AND THE LIKE

George W. Bungay, Jr., Brooklyn, N.Y., assignor to Electrographic Corporation, New York, N.Y., a corporation of New York Filed May 5, 1965, Ser. No. 453,245
3 Claims. (Cl. 101—401.1)

The present invention relates to a method and apparatus for preparing multipage printing plates and the like. It has particular application to the preparation of multipage printing plates in sets for multicolor printing.

In the prior art numerous schemes have been proposed for effecting proper registry of printing plates on printing presses. Obviously, in multicolor work particularly, it is highly essential that separate sets of printing plates used for printing in different colors in separate operations be properly registered on the press. The plates must be of the same dimensions and very accurately mounted in order that the colors may properly be placed on the work as the respective printing operations proceed. Otherwise, the printed work is quite unacceptable.

Thus plates, and sets of plates have been provided in the past with registration markings, or with holes punched in their margins to facilitate proper mounting. Mechanical devices have been mounted on or associated with the press. Various means have been used when page plates are assembled with other plates for multipage printing and numerous schemes of this general type have been attempted in the past. Examples are shown in U.S. Patent 565,153 as well as in U.S. Patents 1,860,361, 2,073,040; and 2,499,100, among others. Most of these, however, have either been deficient in accuracy or have involved many operations or have involved the use of complex and expensive registering machinery. Even with the more complicated procedures the results have not been entirely satisfactory.

The present invention involves in one aspect a relatively simple and direct method for obtaining absolutely accurate assembly of multipage plates, or page molds set up in multiples for the production of unitary multipage plates with relatively simple equipment. Briefly stated, the method of the preesnt invention involves forming a multipage printing plate with accurate registration between the respective pages by registering in turn each of a plurality of single page molds each provided with preformed accurate registration marks. These are placed on a bed which has associated therewith accurately located punches. These punches are operated to provide placement holes in very accurate predetermined relationship with respect to the preregistration marks provided on each page mold. Thereafter, by means of the placement holes, the individual page molds can be assembled on a support sheet. The latter has a set of holes corresponding to those in all the pages to be assembled. Assembly is accomplished by placing the support sheet, which is as large as all the pages to be produced on a single printing plate, on a registration table. The individual plates may then be registered by simply placing them over the same upstanding pins that are used to locate the backing sheet. The assembled page molds are then secured, e.g. by fusion or by means of an adhesive, to the backing sheet and they still bear the original registration marks. A printing surface is then formed of multipage size on the assembly of page molds and backing. The registration marks are retained on the individual page plates in the assembled multipage unit.

This procedure, of course, is repeated for each color assembly when it is desired to produce a color set of multipage printing plates. The actual printing surfaces are preferably formed by silver coating the assembled mold member on the backing with a conventional silver deposition solution. The silver plated face may then be electrodeposited with the usual copper shell. This shell will also include the register marks of the individual page molds so that it can be properly assembled in the press in well known procedures. As they are used in succession, the different color plates will all be mounted in the same precise position. The register marks as well as the register holes may also be reproduced in the electrodeposited plate as bosses. These means will provide register marks by which the assembly of the various color plates may be properly located. Generally, each of the plates will be trimmed for accurate preregister for printing. This normally involves cutting off the marginal portions bearing the bosses corresponding to the register holes. However, if desired, the register marks will be preserved, at least sufficiently to insure accurate alignment in the press.

In its apparatus aspects the invention involves a means for punching the assembly guiding holes in the individual page molds. It represents an improvement over apparatus described in U.S. Patent 2,679,695. Proper punching of the holes having been accomplished by the apparatus of the invention, the method proceeds by assembling a plurality, preferably four, separate page vinyl electrotype molds onto the backing sheet as previously mentioned. Instead of vinyl resin, other suitable materials may be used. However, vinyl polymers such as those of copolymers vinyl chloride and vinyl acetate, as generally used, are presently preferred. The assembly will be made in such a manner as to provide a matrix for formation of the electrotype mold with the four plates assembled in proper register.

The apparatus operates only on a single plate at a time, in the preferred procedure. It comprises a bed plate structure provided with plate holding means which can be shifted backward and forward and also laterally, i.e., in at least two directions in its plane. This bed plate structure is provided with micrometer adjustment means to locate a page mold accurately on the bed plate. Each page mold is provided in advance with register marks along at least two of its sides, preferably two adjacent sides. The apparatus also includes at least one and preferably two micrometer traversed microscopes. These are provided in order that the page molds may be located with extreme accuracy on the bed plate. A set of punches are fixed on the frame which supports the bed plate. These may be adjusted to accommodate page molds of different sizes and are provided on plural sides, preferably two sides, of the bed member. By operating these punches, register holes may be accurately punched on two adjacent sides of the individual page mold.

In operation, the microscope, or preferably a plurality of microscopes, may be run to a proper predetermined position. The vinyl page mold is then traversed to its proper position, as determined by the microscope or microscopes. These microscopes are preferably provided with cross hairs or alignment markings which are brought into register with the register marks on the mold. Thereafter the placement holes are made by operating the punches to form the holes in the margin of the plate outside the printing area.

To prepare a four-plate multicolor set for four colors, sixteen page molds in all will be used. Four of these, all of them for one color, will be first punched and then assembled on a backing sheet provided with matching prepunched holes. The plates are thus accurately fitted with respect to each other by use of the placement holes. After assembly is complete, and a plate has been made on the assembled mold, the placement holes may be trimmed from the assembled mold members.

The invention will be more fully understood by referring to the attached drawings, wherein.

Figure 1:
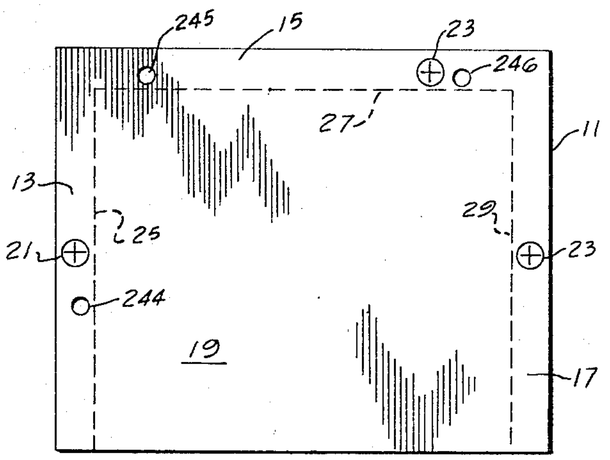
FIGURE 1 shows a single page mold provided with registration marks and indications of punching.

Referring first to FIGURE 1, there is shown in plan view a plastic page mold formed of a sheet of suitable material such as a polyvinyl chloride or polyvinyl acetate copolymer. This is indicated generally at 11. The sheet is somewhat larger than the actual dimensions of the page to be printed so as to provide margins 13, 15 and 17 outside the page area 19. Within the page area, but outside of the trim lines, and in the marginal areas, are provided two accurately located registration marks indicated at 21 and 23, respectively. The two registration marks 21 and 23 are preferably widely spaced apart, as on different marginal portions of each sheet 11. The dotted lines 25, 27 and 29 indicate marginal material that is subsequently to be cut off the sheet 11, as will be presently explained.

Figure 2:
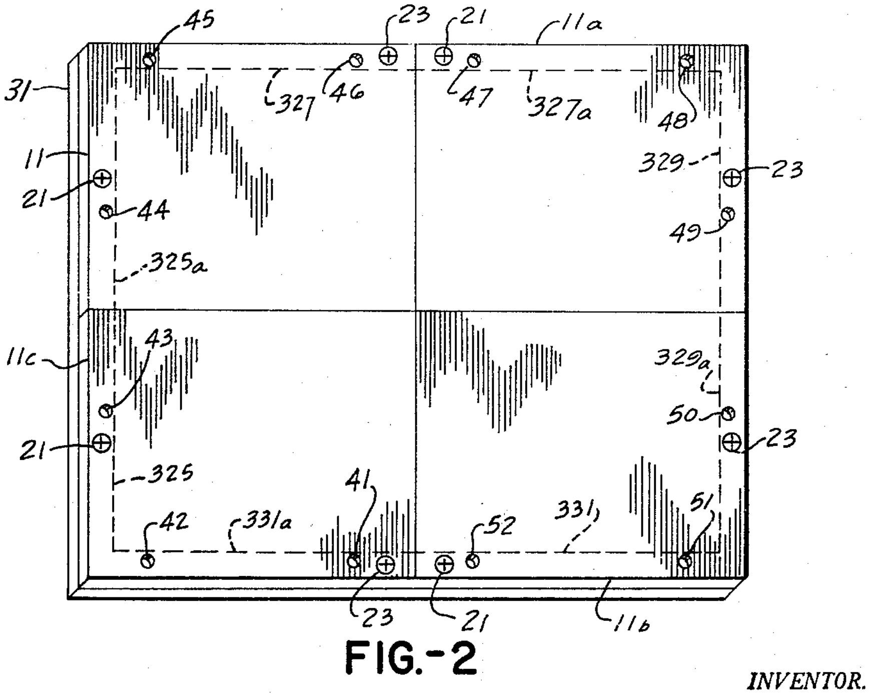
FIGURE 2 shows an assembly of four page molds of the type shown in FIGURE 1.

In FIGURE 2 is shown an assembled unit consisting of four sheets 11, **11*a*, 11*b* and 11*c* placed together in registered position on a backing sheet 31. The latter also may be formed of vinyl chloride-, vinyl acetate-copolymer, or other suitable plastic material. Backing sheet 31 is provided in advance with a series of twelve holes which are carefully prepositioned. These are indicated at 41, 42, 43, etc., to and including 52**.

The sheet 31 is adapted to be laid on a table, not shown, which has twelve projecting studs or pins. These are sized to fit precisely in the holes 41, 42, 43, etc., up to and including hole 52. After the individual plate molds or page molds 11, **11*a*, etc., are provided with corresponding punched holes in a manner to be described presently, they are also placed over the studs projecting from the surface of the table or support. These pins are prelocated in perfect alignment with the openings 41, 42, 43, etc., in sheet 31**. This will be further explained.

Figure 3:
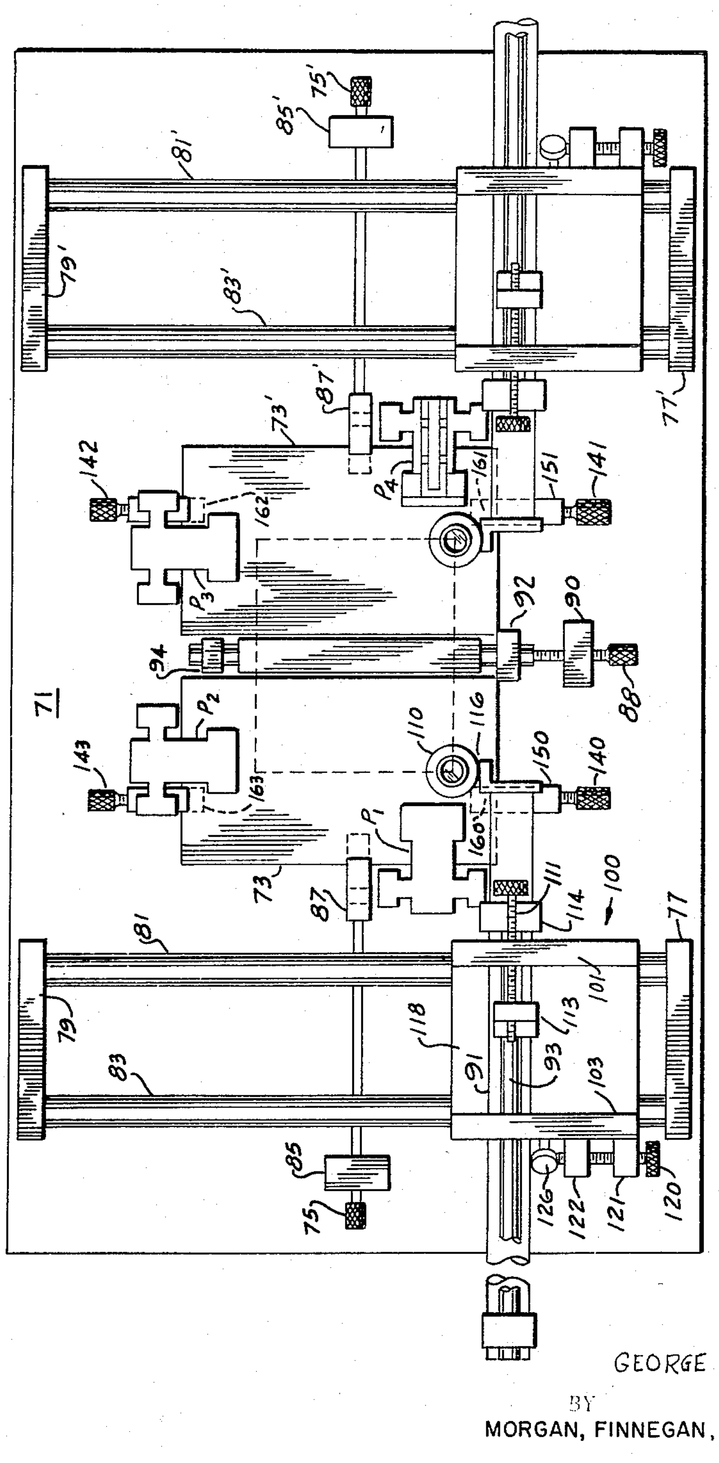
FIGURE 3 is a plan view of the bed plate registering and punching apparatus.
Figure 4:
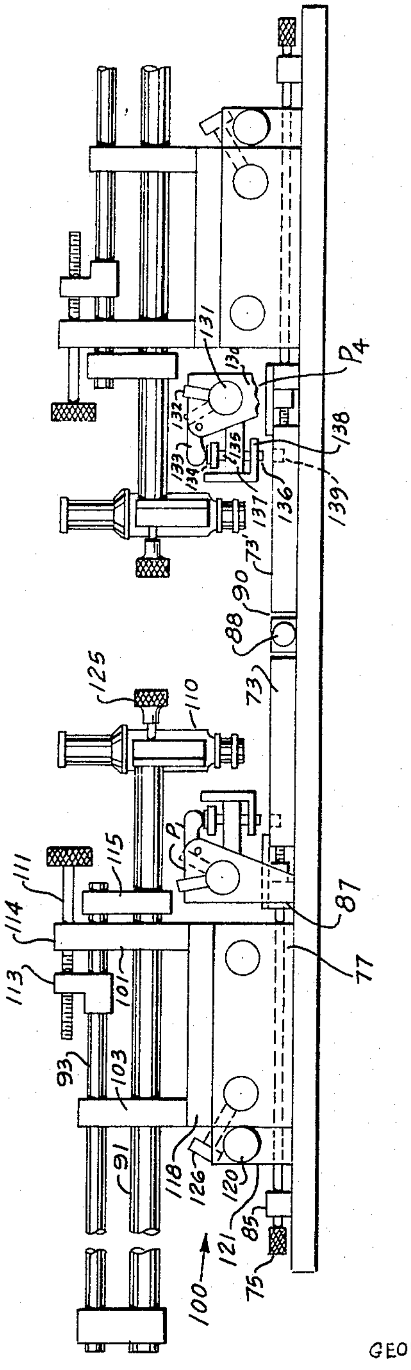
FIGURE 4 is a front elevational view of the apparatus of FIGURE 3.

Referring now to FIGURES 3 and 4, the registering and punching apparatus which forms one aspect of the present invention will now be described.

The registering and punching apparatus comprises a base or supporting plate 71, best shown in FIGURE 4, on which are mounted the several operating parts. These includes a two-part bed plate 73, 73′ which can be adjusted longitudinally or transversely of the support plate 71. Lateral adjustment of a page mold on the plates 73, 73′ is accomplished by means of micrometer screws 75, 75′. In the arrangement shown the two plates 73 and 73′ support a single page mold.

Supported on the base plate 71 are a pair of upstanding frame members 77 and 79 for mounting a subframe assembly, indicated generally by reference numeral 100. These are shown at the left in FIGURES 3 and 4, but will also be duplicated on the right as indicated at 77′ and 79′, respectively. A pair of rigid circular bars 81, 83 are mounted in the frame members 77, 79, these parts also being duplicated at the right as indicated at 81′ and 83′. In general, the parts at the right duplicate those at the left and will not be further described.

The micrometer screws 75, 75′ previously mentioned are mounted for rotation but not for sliding motion in upstanding bosses 85, 85′ formed on the base plate 71. The opposite end of each screw is threaded through a slidable block 87, 87′ which is a plate locating and adjusting means. Another micrometer screw 88 is mounted in an upstanding boss 90, also supported on frame or base plate 71. The screw 88 is threaded through the boss 90 and is mounted in blocks or collars 92 and 94 which can be moved forward or backward along the axis of the screw as the screw is rotated through its threaded support 90. The blocks 92 and 94 are connected to the plates 73, 73′ so as to cause these plates to move forward or backward as the screw is adjusted. By this means the support bed consisting of the plates 73 and 73′ may be adjusted accurately to any desired position but only along rectilinear lines.

A microscope-supporting subframe 100, previously mentioned, is provided with vertical frame members shown at 101, 103, these members being respectively the right- and left-hand side elements of the subframe. Members 101, 103 are slidably mounted as a unit for movement forward and backward, as seen in FIGURES 3 and 4, along the guide bars 81 and 83. This is best shown in FIGURES 3 and 4. The subframe includes a pair of supporting sliding bars 91 and 93 which can be moved to the right or left through slide openings in the frame members 101, 103. The lower bar 91 preferably is formed of heavier stock to give rigidity to the structure, since it supports a microscope 110. A micrometer adjusting screw 111 is threaded through an upper projection 114 of the frame member 101. The screw is mounted for rotation but not for sliding movement in this member. The threaded end of the screw 111 passes through a threaded nut 113 secured to the bar 93. Hence by rotating the screw 111, the sliding bar 93 and also bar 91 can be moved to the right or left.

A bracket 115 is rigidly fixed to both the sliding bars 91 and 93 so that they move in unison. The microscope 110 is mounted on the end of bar 91, being offset to the rear as seen in FIGURE 3 by reason of a mounting bracket 116.

To adjust the microscope 110 to the right or left, micrometer screw 111 is used.

For adjustment of the microscope forward or backward as seen in FIGURES 3 and 4, the subframe consisting of members 101, 103, etc., which are joined together by a rigid plate 118, FIGURE 4, is slidably mounted on the bars 81 and 83 as previously mentioned. A micrometer screw 120 rotatably but not slidably mounted in a boss 121 secured to base plate 71 is threaded through a boss 122 secured to the subframe side member 103. As the screw is rotated the subframe can be moved forward or backward along the supporting guide bars 81, 83. This adjusts the microscope forward or backward with respect to the base plate. The usual microscope focusing screw is indicated at 125. The microscope is preferably provided with cross hairs for precise registration with fine registeration marks such as those indicated in FIGURES 1 and 2 at 21, 23. However, other markings within the optical instrument may be used.

A set screw 126 mounted in the subframe member 103 is adapted to impinge against the supporting guide bar 83 so that once the subframe is adjusted along the sliding bars it can be locked in place. Then the lateral left or right adjustment of the microscope may be more accurately effected. By using two microscopes on two registration marks, a page mold may be quickly located with micro accuracy.

Mounted on the base plate 71 are a plurality of punching devices $P_1$, $P_2$, etc., which will next be described. Two of these, $P_1$ and $P_4$ are shown in FIGURE 4 and they are essentially identical. Each consists of an upstanding rigid bracket member 130, which is bored to receive a rotatable shaft 131 operated by an arm 132. Also secured to shaft 131 is a presser arm 133 adapted to engage the head 134 of a slidable punch 135 provided with a punching tip of the desired size, indicated at 136. The punch slides through bracket guide member 137 and 138 and is adapted to be received in a suitable opening 139 formed in the support plates 73, 73′.

In use, a page mold is placed on the plates 73, 73′ and is positioned by adjusting sliding screws 140, 141, 142 and 143, as well as screws 75, 75′ and 88. Each of the screws 140, 141, etc., is mounted in an upstanding boss 150, 151, etc., and is adapted to adjust with micrometer accuracy a page mold positioning block 160, 161, 162, or 163, respectively. By these means a page mold laid on the bed plate can be moved precisely to a predetermined position under the microscope.

Assuming that the microscope 110 has been adjusted to the desired position, a page mold or a plastic sheet to be used as such is laid on the bed plate. This sheet has already been provided with registration marks, as indicated at 21, 23, FIGURE 1. It is then adjusted by manipulating screws 75, 75', 88, 140, 141, etc., until the registration marks come directly in line with the cross hairs or locator markings of the microscope. By using the two microscopes, the registration may be expedited and this is the preferred arrangement and procedure.

As soon as registration is achieved, the various punches $P_1$, $P_2$ etc., are operated to punch the now precisely located openings in the page mold as indicated in FIGURE 1 at 244, 245 and 246, respectively. In an assembly these locator holes may be considered to overlie the punch marks 44, 45 and 46 which were performed in the base support sheet 31, as indicated in FIGURE 2. By this means, precise registration of the page mold which is next to be cemented or fused to the sheet 31 is assured. The same procedure is repeated for each of the other page molds 11*a*, 11*b* and 11*c*, as seen in FIGURE 2.

After the page molds are secured to the base sheet 31 the whole assembly may be trimmed along the dotted lines 325, 325*a*, 327, 327*a*, 329, etc., to 331*a*. The amount and type of trimming obviously will depend on the setup on the printing press. In some cases it may not be objectionable to leave the margins, e.g., non-printing areas, outside the printing area on the plate while printing is being done.

There is thus produced a composite mold having its four pages accurately registered with each other and accurately registered for positioning on the printing press.

It will be obvious that various modifications and changes can be made within the spirit of this invention and it is intended by the claims which follow to cover such as far as prior art properly permits.

What is claimed is:

1. The method of forming a four page printing plate with accurate registration between the respective pages, which comprises, in combination, the steps of forming four page molds, each having marginal sides outside the printing area, micro-registering in turn each of said four page molds provided with preformed accurate registration marks on different adjacent marginal sides of each page mold on a bed, punching placement holes in accurate predetermined relationship with respect to the registration marks in each page mold on adjacent marginal sides of each page mold, said placement holes being punched on less than all sides of each page mold, trimming the marginal sides from each of the page molds which do not contain placement holes, assembling the four punched page molds in registered position on a backing sheet of multipage size by means of pins passing through prepunched placement holes located in said backing sheeet corresponding to the placement holes of all the individual page molds, and securing the page molds to said backing sheet.

2. Method of claim 1 wherein a unitary printing plate is formed on the assembled page molds with the registration marks of the various pages all showing on the finished plate.

3. The method of producing multipage color sets of printing plates which comprises:

(a) forming four page molds for a single color of moldable plastic sheet material, each of said molds having a marginal area outside the printing area, and providing each of said molds with arcuate registration marks thereon in different adjacent marginal areas, (b) placing each page mold separately on a support bed in accurate micro-register position and punching a plurality of locator holes in adjacent marginal areas in accurately predetermined relationship with respect to the registration marks, (c) trimming the marginal areas from each of the page molds which do not contain locator holes, (d) placing a prepunched plastic sheet of multipage size having control locator holes corresponding to all those on four page molds on a table by guiding the control holes over projecting pins on said table, (e) assembling the four page molds on said table and over said sheet by guiding the punched holes in each plate over appropriate pins on the table, (f) securing the page molds to the plastic sheet, (g) forming a printing surface on the assembled page molds while retaining registration markings on each page, (h) repeating the process for each color until a full set of color plates is produced.

References Cited by the Examiner

UNITED STATES PATENTS

| | | | |
|---|---|---|---|
| 2,000,756 | 5/1935 | Heck | 101—426 |
| 2,099,364 | 11/1937 | Hunter | 101—426 |
| 2,199,614 | 5/1940 | Bungay | 101—426 |
| 2,259,458 | 10/1941 | Davis | 83—412 |
| 2,382,801 | 8/1945 | Mauer | 83—412 |
| 2,428,428 | 10/1947 | McCarter | 101—401.1 |
| 2,536,316 | 1/1951 | Schwarz et al. | |
| 3,160,096 | 12/1964 | Norton | 101—401.1 |

ROBERT E. PULFREY, *Primary Examiner.*

J. A. BELL, *Assistant Examiner.*

UNITED STATES PATENT OFFICE
CERTIFICATE OF CORRECTION

Patent No. 3,288,063 November 29, 1966

George W. Bungay, Jr.

It is hereby certified that error appears in the above numbered patent requiring correction and that the said Letters Patent should read as corrected below.

Column 4, line 44, for "registeration" read -- registration --; column 5, line 16, for "performed" read -- preformed --; column 6, line 14, for "arcuate" read -- accurate --.

Signed and sealed this 12th day of September 1967.

(SEAL)
Attest:

ERNEST W. SWIDER
Attesting Officer

EDWARD J. BRENNER
Commissioner of Patents